Dec. 7, 1954   C. O. HAWKINS   2,696,069
TOBACCO HARVESTING MACHINE
Filed Feb. 10, 1953   10 Sheets-Sheet 1

Curtis Owen Hawkins
INVENTOR.

Dec. 7, 1954  C. O. HAWKINS  2,696,069
TOBACCO HARVESTING MACHINE
Filed Feb. 10, 1953  10 Sheets-Sheet 2

Fig. 2

Curtis Owen Hawkins
INVENTOR.

Dec. 7, 1954  C. O. HAWKINS  2,696,069
TOBACCO HARVESTING MACHINE
Filed Feb. 10, 1953  10 Sheets-Sheet 3

Curtis Owen Hawkins
INVENTOR.

Dec. 7, 1954  C. O. HAWKINS  2,696,069
TOBACCO HARVESTING MACHINE
Filed Feb. 10, 1953  10 Sheets-Sheet 7

Curtis Owen Hawkins
INVENTOR.

Dec. 7, 1954     C. O. HAWKINS     2,696,069

TOBACCO HARVESTING MACHINE

Filed Feb. 10, 1953     10 Sheets-Sheet 8

Curtis Owen Hawkins
*INVENTOR.*

Dec. 7, 1954  C. O. HAWKINS  2,696,069
TOBACCO HARVESTING MACHINE
Filed Feb. 10, 1953  10 Sheets-Sheet 9

Curtis Owen Hawkins
INVENTOR.

BY *Clarence A. O'Brien*
*and Harvey B. Jacobson*
Attorneys

Dec. 7, 1954  C. O. HAWKINS  2,696,069
TOBACCO HARVESTING MACHINE
Filed Feb. 10, 1953  10 Sheets-Sheet 10

Curtis Owen Hawkins
INVENTOR.

United States Patent Office 2,696,069
Patented Dec. 7, 1954

2,696,069

TOBACCO HARVESTING MACHINE

Curtis Owen Hawkins, Cove City, N. C.

Application February 10, 1953, Serial No. 336,108

16 Claims. (Cl. 56—27.5)

My invention relates to improvements in power operated tobacco harvesting machines for harvesting leaf tobacco off the plant stalks.

The principal object of my invention is to provide a power operated machine for simultaneously stripping leaves of two side by side rows of tobacco plants off the stalks progressively along the rows beginning at selected heights from the ground so that the lowermost leaves which ripen first may be harvested while the upper leaves are left on the stalks to ripen for subsequent harvesting.

Another object is to provide a machine for accomplishing the above which will strip the leaves off the stalks cleanly without injuring the stalks or upper leaves by bending the stalks regardless of the distance between the plants in the rows.

Another object is to provide a machine for stripping the leaves off the stalks of the plants downwardly so that the stripping operation may be performed starting at the height on the plants to which the leaves have ripened.

Still another object is to provide a machine for the above purposes in which the stripping is accomplished by horizontal stripper tines carried forwardly by forward travel of the machine into and out of successive plants in the rows and revolved and automatically raised and lowered to perform the stripping operation.

Still another object is to provide a machine for the above purposes which is easy to operate, reliable, not liable to get out of order and is comparatively simple in construction and inexpensive to manufacture.

Other and subordinate objects within the perview of my invention will become readily apparent when the succeeding description and claims are read in conjunction with the drawings accompanying and forming part of this specification.

Figure 3:
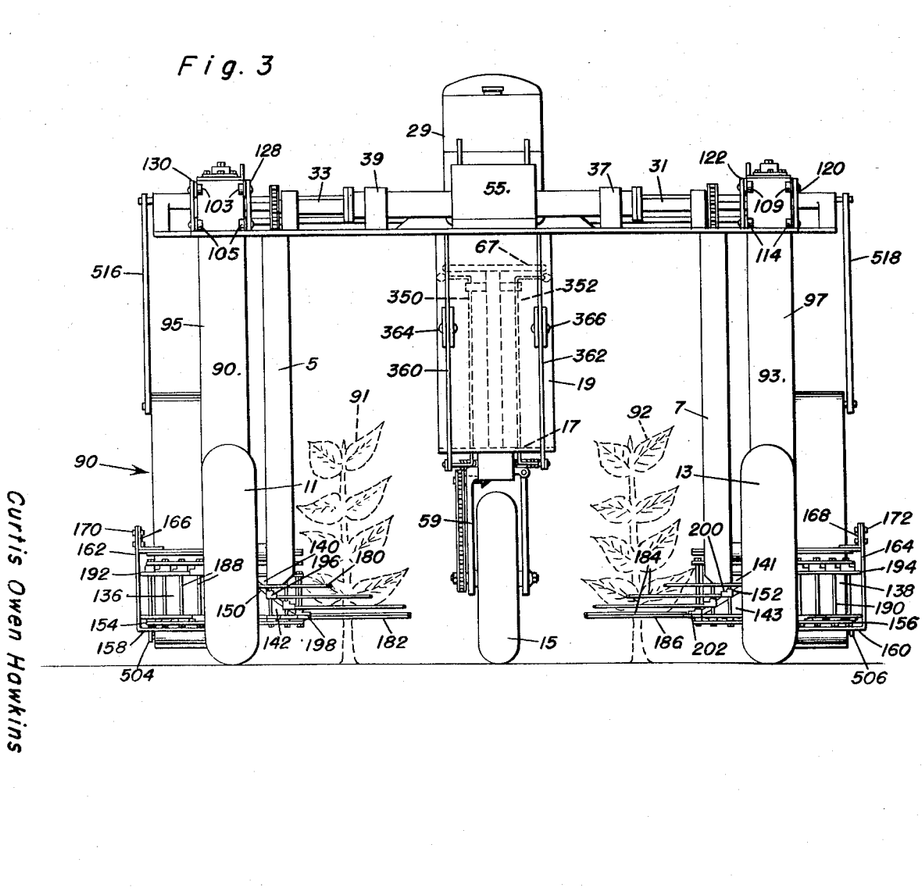
Figure 3 is a view in front elevation.

Referring to the drawings by numerals, the harvesting machine of my invention comprises a chassis frame 1 including a generally rectangular flat platform 3, of skeleton form for strength and lightness, a pair of front corner legs 5, 7 at right and left sides of the platform, and a single center rear leg 9 hollow for a purpose presently seen. A pair of right and left traction wheels 11, 13 are mounted on the lower ends of the legs 5, 7, and a rear steerable wheel 15 is mounted beneath the leg 9 by means presently described. The platform 3 is elevated by the legs 5, 7, 9 for clearing the tops of tobacco plants. The front legs 5, 7 and wheels 11, 13 at opposite sides of the platform 3 are spaced apart to straddle two side by side rows of tobacco plants, as shown in Figure 3, while the steerable wheel 15 runs between the rows.

A floor panel 17 in the longitudinal center of the platform 3 below the same extends forwardly from the lower end of the center leg 9 and is suspended at its front end rearwardly of the transverse center of said platform 3 by an upright panel 19 depending from and suitably secured to the platform 3. An operator's seat 21 is fixed on the floor panel 17 beneath an opening 23 in said platform with a rear brace 24 for said seat. A collar 25 on the leg 9 to which the rear end of the floor panel 17 is suitably secured supports said rear end. The leg 9 is provided with side reinforcing webs 27.

A conventional motor 29 on the platform 3 at the front end of said platform and in the longitudinal center thereof propels the machine. The motor 29 is of the well known internal combustion engine type combined with a tractor rear end including a pair of axle shafts 31, 33 extending from opposite sides of the motor out of a pair of axle housings 34, 35 in this instance extending transversely of the platform 3 through mounting brackets 37, 39 on same platform so that the outer ends of the axle shafts 31, 33 extend over the legs 5, 7.

Sprocket and chain drives 41, 43 on the outer ends of the axle shafts 31, 33 operatively connect said shafts to the traction wheels 13, 11 with the chains 45, 47 extending through suitable slots 49, 51 in the platform 3 below which said drives 41, 43 are housed in the legs 7, 5 which are channeled for that purpose.

A power take off shaft 53 extends rearwardly from the motor 29 in the longitudinal center and over the platform 3 for a purpose presently seen. As will be understood a differential, not shown, in a differential housing 55, drives said shafts 31, 33. Any suitable motor controls, not shown may be provided for the motor 29. The motor 29 forms, per se, no part of my invention except as it may enter into combination with other components of the machine. A suitable cross member 57 on the platform 3 supports the motor 29. The axle shafts 31, 33 are journaled in bearings 32, 36.

For steering purposes the steerable wheel 15 is mounted in a fork 59 rotatable on a collar 61 fast on the lower end of a vertical shaft 63 in the rear leg 9. The fork 59 has a hinged leg 65 for assembly with the wheel 15.

Figure 17:
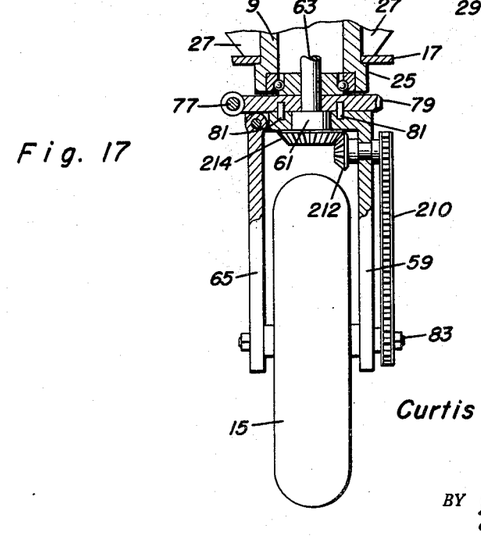
Figure 17 is an enlarged elevational view of the steerable wheel and mounting therefor with parts broken away and shown in section; and, Figures 18 and 19 are diagrammatic plan and perspective views, respectively, illustrating the operation of the stripping tines.

Steering means for said wheel 15 comprises a steering wheel 67 on a steering post 69 depending through a steering column 71 rising from the floor panel 17 in front of the seat 21. The steering post 69 is operatively connected below said panel 17 by housed bevel gearing 73 to a horizontal rearwardly extending worm shaft 75 journaled in bearings 76 on said panel 17 and provided with a rear end worm 77 meshing with a worm wheel 79 fixed by pins 81 (see Figure 17) on top of the fork 59 between said fork and the lower end of the rear leg 9 and rotatable concentrically around the vertical shaft 63 which is live for a purpose presently explained. A live axle shaft 83 on which the steerable wheel 15 is fixed is journaled through the fork 59 for drive by said wheel for a purpose to be explained.

A pair of duplicate right and left stripping units 90, 93 are carried by the platform 3 at opposite sides and in the approximate transverse center thereof, on one of which, the right stripping unit is best shown in detail in Figures 2, 4, 5 and 6. The stripping units 90, 93 straddle two side by side rows 91, 92 of plants.

Each stripping unit 90, 93 comprises a vertically adjustable carriage frame 95, 97 vertically slidable between flanged guide rollers the guide rollers for the right stripping unit 90 being designated 99, 101, 103, 105 and those for the left stripping unit 93 being designated 107, 109, 114, there also being rollers, not shown, for the left hand stripping unit 93 corresponding to the rollers 101 for the right hand stripping unit 90. By inspection of Figures 1, 2, 4 and 5 it will be seen that the guide rollers for the carriages 97, 95 for each stripper unit 93, 90 are suitably arranged in opposite sets of four in suitable brackets 116, 118, 120, 122 on the left side of the platform 3 and in brackets 124, 126, 128, 130 on the right side of said platform.

Each carriage frame 95, 97 carries and has bolted to its bottom, as at 134, (see Figure 4) in horizontal position a control drum 136, 138 formed of upper and lower half sections 140, 142, 141, 143 bolted together by slotted plates 144, 146 and bolts 148 (see Figure 4) to form a circumferential cam slot 150, 152 in each drum presently referred to in detail.

Figure 1:
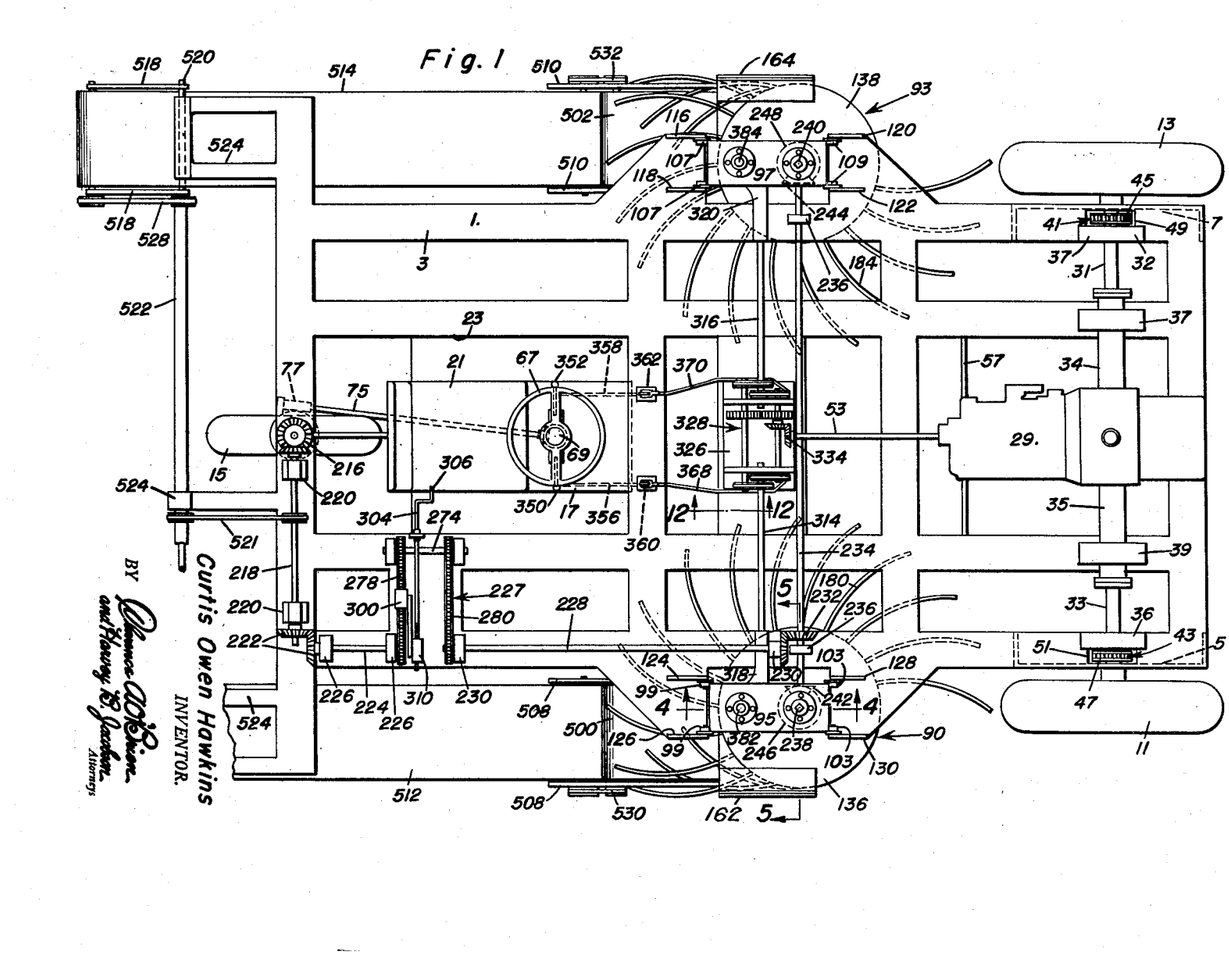
Figure 1 is a view in plan of the machine of my invention in the preferred embodiment thereof.
Figure 6:
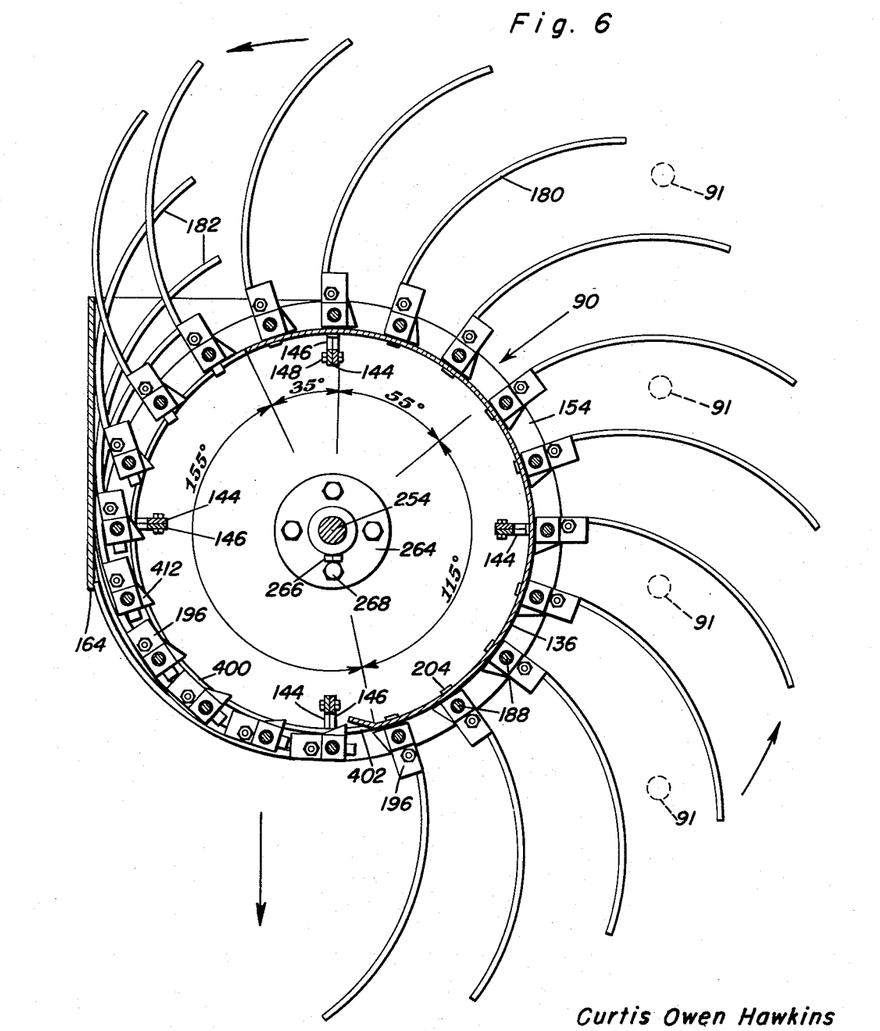
Figure 6 is an enlarged horizontal section taken on the line 6—6 of Figure 2.

A driving disk 154, 156 is juxtaposed horizontally and concentrically beneath each drum 136, 138. The purpose of the control drums 136, 138 and the driving disks 154, 156 will presently appear. Bottom guard disks 158, 160 are supported below the driving disk 154, 156 from vertical cam plates 162, 164 spaced outwardly of the outboard sides of said drums and, as best shown in Figures 1 and 6, to extend rearwardly of the vertical axes thereof. The purpose of the cam plates 162, 164 will presently appear. The cam plates 162, 164 are suspended by brackets 166, 168 and bolts 170, 172 from the tops of the drums 136, 138.

Each stripping unit 90, 93 further includes a series of upper and a series of lower rubber covered stripping tines, or fingers, designated 180, 182 in the right unit 90 and 184, 186 in the left unit 93. There are an equal number of tines in each series. Posts 188, 190 rise from the driving disks 154, 156 and are spaced equidistantly around the drums 136, 138 exteriorly thereof in circular series with horizontal connecting rings 192, 194 connecting the posts 188, 190 at the top thereof. The upper and lower series of tines 180, 182 of the right stripping unit 90 are provided with tail blocks 196, 198 pivoted on the posts 188 so that said tines 180, 182 may swing on said posts 188 horizontally into substantially radial operative position relative to said drum 136 or into inoperative position alongside said drum. The upper and lower series of tines 184, 186 of the stripping unit 93 are similarly mounted by tail blocks 200, 202 on the posts 190. The upper series of tines 180, 184 in both stripping units 90, 93 are slidable vertically on the posts 188, 190 for a purpose presently explained and all said tines are curved to swing close to the drums 136, 138 when in inoperative position. The posts 188, 190 are suitably bushed as at 204.

Figures 7, 8, 9, 10, 11:
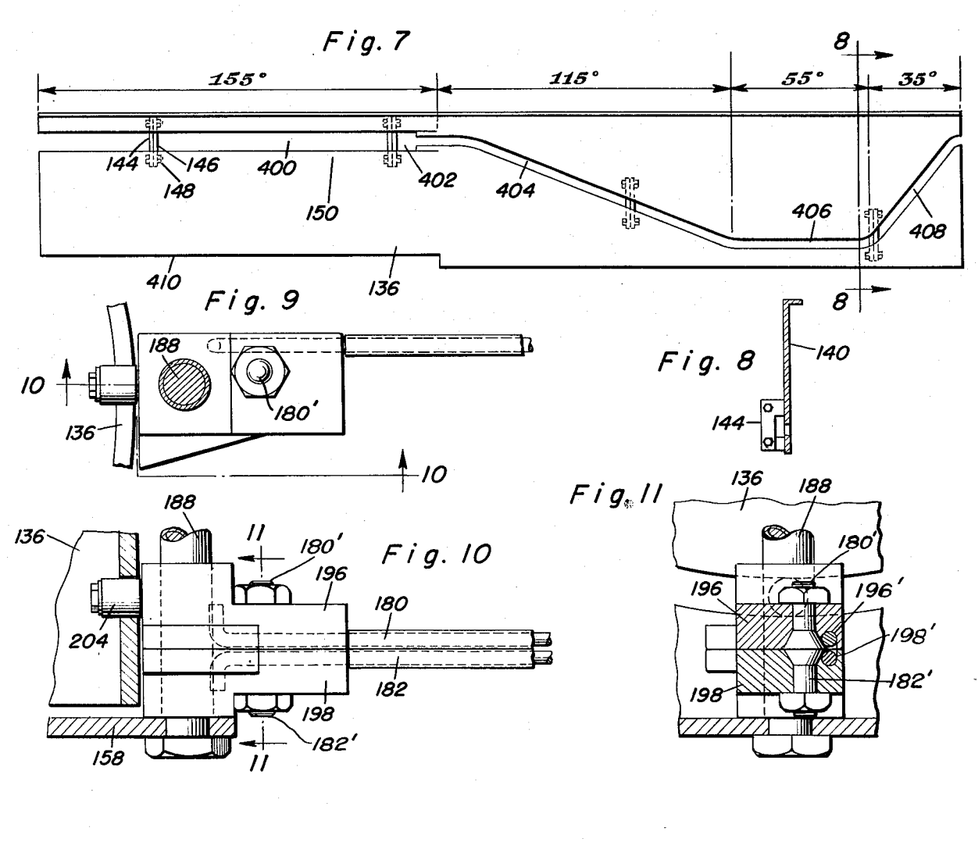
Figure 7 is an enlarged schematic view of one of the control drums.
Figure 8 is a view in vertical section taken on the line 8—8 of Figure 7.
Figure 9 is an enlarged fragmentary plan view, with parts broken away and shown in section, of the stripper tines shown in the left portion of Figure 4 of the right stripping unit lowered into gripping relation to one of the stripper tines of the lower series.
Figure 10 is a view in vertical section and side elevation of the same taken on the line 10—10 of Figure 9.
Figure 11 is a view in vertical section taken on the line 11—11 of Figure 10.
Figure 12:
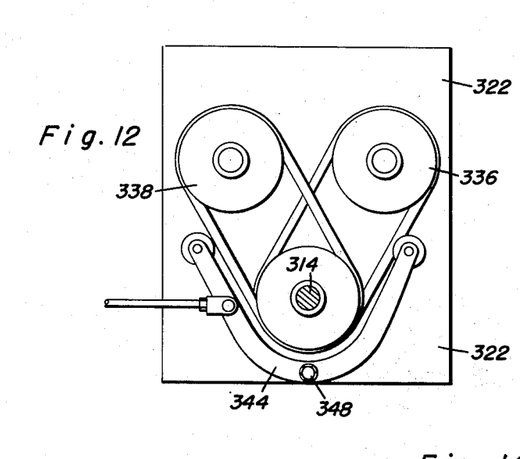
Figure 12 is an enlarged vertical section taken on the line 12—12 of Figure 1 and showing the drive reversing means for raising or lowering the stripping units.
Figure 13:
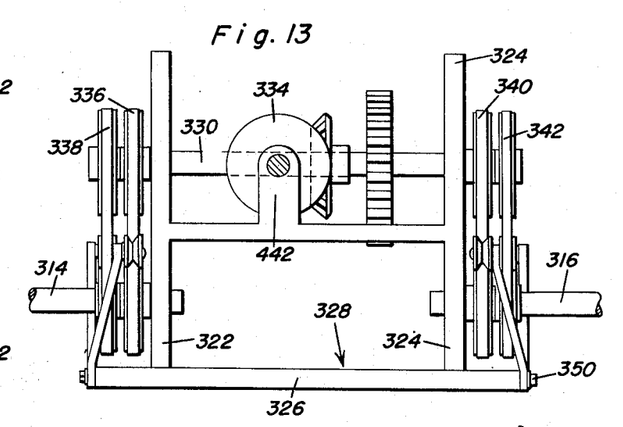
Figure 13 is a front elevational view of the same.
Figure 14:
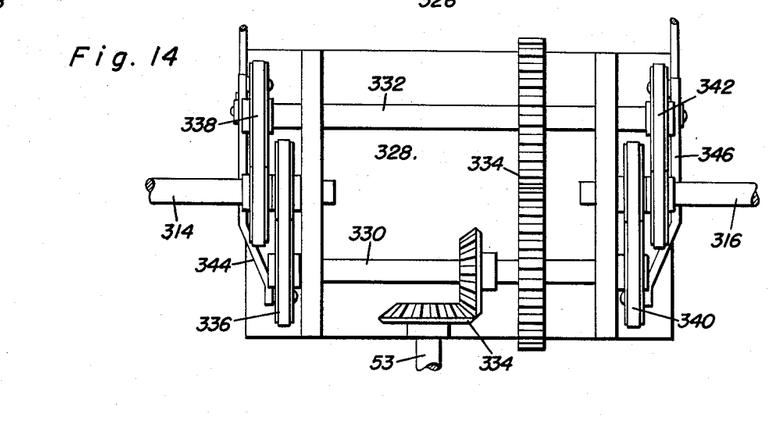
Figure 14 is a plan view of the same.

As best shown in Figures 9, 10 and 11, with reference to the tines 180, 182 of the right stripping unit 90, said tines are held by bolts 180', 182' in grooves 196', 198' in the tail blocks 196, 198. The tines 184, 186 are similarly held in the tail blocks 200, 202. Also as shown in Figures 4, 5, 6, 10 the tail blocks 196 of the upper series of tines of the right stripping unit 90 are provided with rear end rollers 204 relatively narrower than said blocks and adapted to run in and behind the cam slot 150 in the drum 140 of said unit. The tail blocks 200 of the upper series of tines 184 of the left stripping unit 93 are similarly provided with rollers, not shown, for running in the cam slot 152 of the drum 138.

A drive is provided for revolving the series of tines 180, 182 and 184, 186 in unison and oppositely in the right and left stripping units 90, 93 with respect to each other with the tines of each unit revolving at the inboard sides of said units rearwardly of the chassis 1, at the same rate of speed as that of forward travel of the chassis.

This drive to said tines comprises a sprocket and chain connection 210 from the live axle 83 of the steerable wheel to a bevel gear 212 on the fork 59 meshing with a bevel gear 214 on the beforementioned collar 61 and whereby the beforementioned shaft 63 is revolved. The shaft 63 is operatively connected at its upper end by bevel gearing 216 to one end of a first jack shaft 218 journaled in bearings 220 on the rear end of the platform 3. Bevel gearing 222 connects the other end of said jack shaft 218 to the rear end of a first longitudinal shaft 224 journaled in bearings 226 on the right side of the platform 3.

A speed accelerating and retarding means 227, presently described, operatively connects the other end of shaft 224 to the rear end of a second longitudinal drive transmitting shaft 228 journaled in bearings 230 on the right side of the platform 3 in alignment with and spaced from said first shaft 224 and which is connected by bevel gearing 232 to a second transverse jack shaft 234 extending across the platform 3 and journaled in bearings 236.

The second jack shaft 234 is operatively connected to a pair of vertical right and left drive shafts 238, 240 for the driving disks 154, 156 for the right and left stripping units 90, 93 by bevel gears 242, 244 on opposite ends of said shaft 234 meshing with bevel gears 246, 248 on said shafts 238, 240 respectively thereon.

Figure 4:
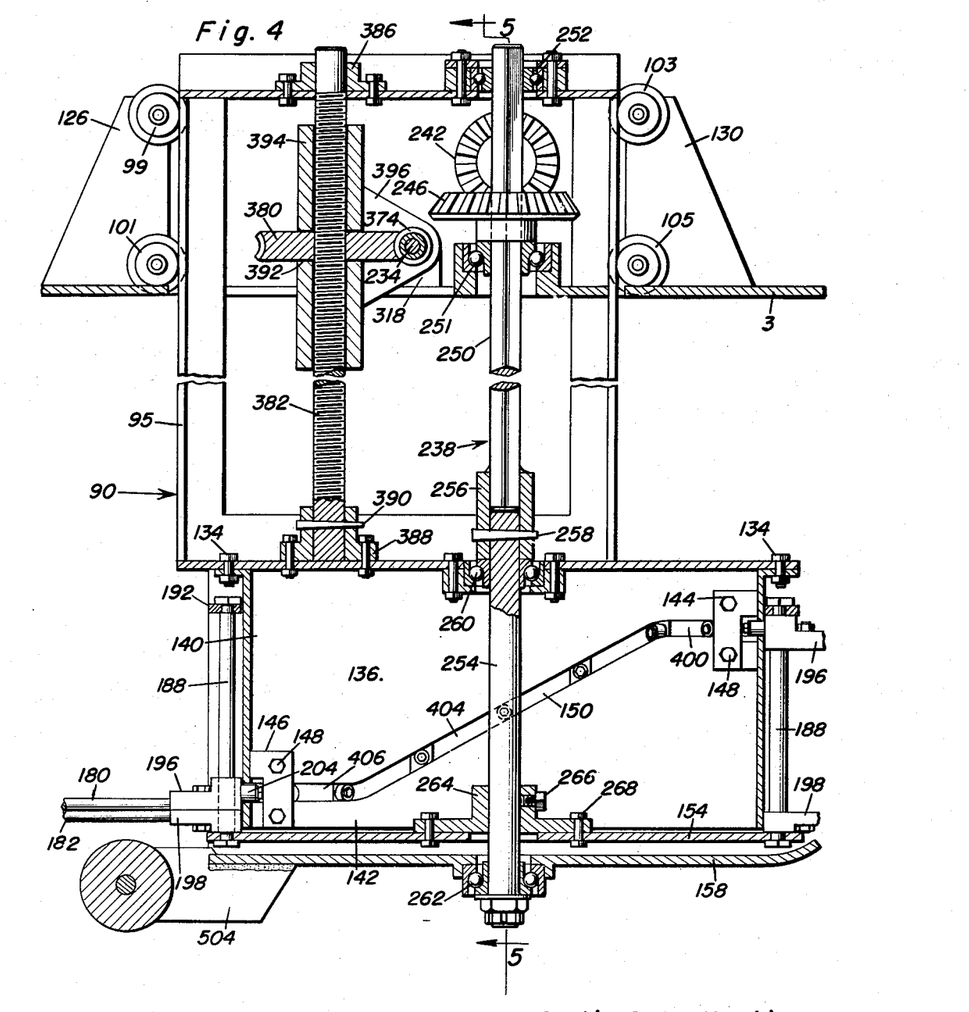
Figure 4 is an enlarged fragmentary sectional view with parts broken away taken on the line 4—4 of Figure 1.
Figure 5:
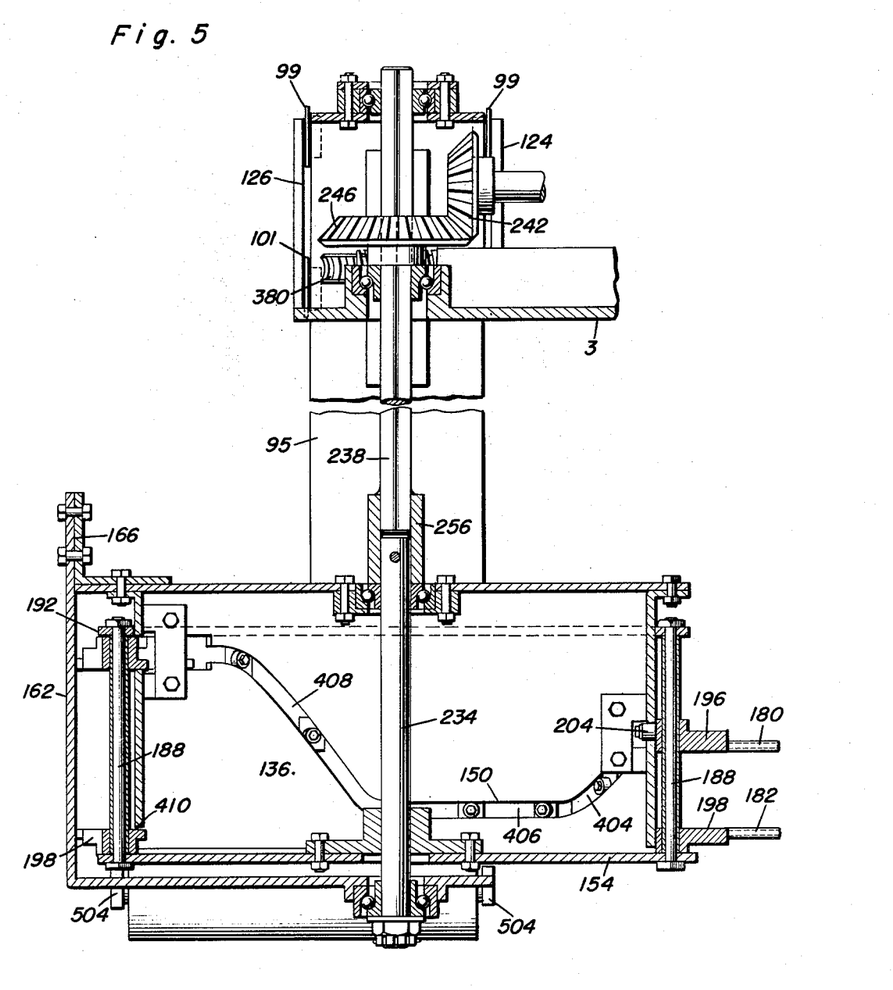
Figure 5 is a view in vertical section taken on the line 5—5 of Figure 4, partly broken away.

The drive shafts 238, 240 are axial to the drums 136, 138 and are mounted and arranged as shown in Figures 4 and 5 with reference to the right stripping unit 90.

As shown in Figures 4 and 5 the drive shaft 238 comprises an upper squared section 250 on which the bevel gear 246 is splined to permit vertical movement of the carriage 95 and drum 136, and said shaft is rotatably mounted for vertical movement in a relatively fixed bearing 251 in the platform 3 and is rotatably mounted in a vertically movable bearing 252 on top of the carriage 95.

A lower aligned section 254 of the shaft 238 is detachably fixed for assembly purposes in a lower end sleeve 256 on the section 250 and held in said sleeve by a cross pin 258.

The lower section 254 of the shaft 238 is journaled in a bearing 260 in the bottom of the frame 95, which is to say the top of the drum 136, and is journaled in a bearing 262 on the guard plate 158. A collar 264 on the lower section 254 secured thereto by a set screw 266 is bolted as at 268 to the driving disk 154 and drivingly connects the shaft 238 to said disk 154.

Figure 15:
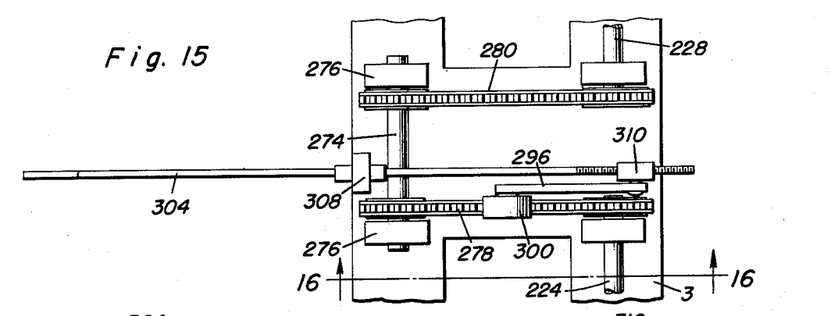
Figure 15 is an enlarged plan view of the control means for the drive to the stripper fingers.
Figure 16:
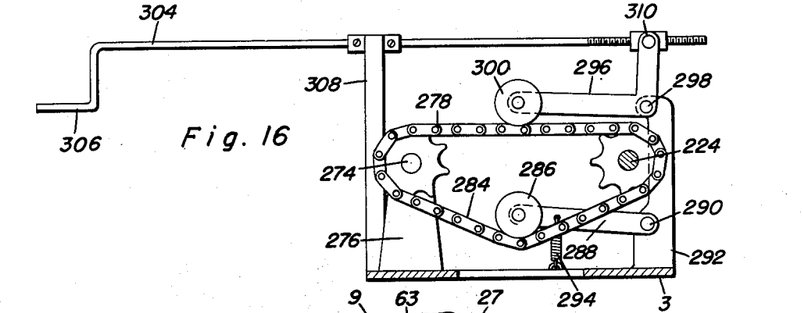
Figure 16 is a view in vertical section taken on the line 16—16 of Figure 15.

The previously mentioned speed accelerating and retarding means 227 (see Figures 1, 15, 16) comprises a transmission shaft 274 parallel with and bridging the space between the first and second longitudinal shafts 224, 228 and journaled in laterally spaced relation thereto in bearings 276 on the platform 3. A sprocket and chain drive 278 operatively connects the front end of the first longitudinal shaft 224 to said transmission shaft 274 and a similar sprocket and chain drive 280 operatively connects said shaft 274 to the rear end of the second longitudinal shaft 228. The sprocket and chain drive 278 has a slack lower chain run 284 downwardly tensioned by a slack take up roller 286 mounted on a vertically pivoting arm 288 pivoted, as at 290, on a riser 292 on the platform 3 with a suitably connected spring 294 swinging said arm downwardly.

A bell crank lever 296 is pivoted as at 298 on the riser with a roller 300 thereon riding the upper chain run 278 of said sprocket and chain drive 278 and is swingable in opposite directions to cause said roller to flex said upper run downwardly or permit it to be tightened by the slack take up roller 286 so as momentarily accelerate or retard the operation of the second longitudinal shaft 228 relative to the first longitudinal shaft 224 and correspondingly vary the speed of revolution of the series of stripper tines 180, 182, 184, 186.

A screw feed shaft 304 with an operating crank 306 adjacent the operator's seat 21 is journaled in a riser 308 on the platform 3 and operatively connected, as at 310, to the bell crank 296 with the crank 306 within convenient reach of said seat.

Drive means is provided for raising and lowering the carriage frames 95, 97 to raise and lower the series of tines 180, 182, 184, 186 and the drums 136, 138 for starting the stripping operation at different heights on the plants said drive comprising the following. This drive comprises a pair of aligned transverse right and left worm shafts 314, 316 associated with the carriages 95, 97 respectively and which are journaled at the outer ends thereof in suitable bearings 318, 320 on the platform 3 with inner spaced apart ends journaled in the sides 322, 324 of a U-shaped mounting bracket 326 suitably fixed to the platform 3 and supporting a reversible transmission 328 for driving said shafts in reverse directions by the power take off shaft 53 of the motor 29.

The transmission 328 (see Figures 1 and 12 to 14) comprises a pair of front and rear horizontal, parallel jack shafts 330, 332 journaled in said sides 322, 324 horizontally. Bevel gearing 334 drivingly connects the power take off shaft 53 with front shaft so that the same are driven oppositely relatively. A pair of belt and pulley drives 336, 338 operatively connect corresponding ends of the front and rear jack shafts to the inner end of the right worm drive shaft 314. A similar pair of belt and pulley drives 340, 342 operatively connect the outer ends of said shafts 330, 332 to the inner end of the left worm shaft 316. The belts of the described belt and pulley drives are loose to slip so that said transmission slips and is ineffective. A suitable bearing 342 for the power take off shaft 53 is provided in the bracket 326.

A pair of U-shaped belt tighteners 344, 346 are pivoted as at 348, 350 on the bracket 326 at opposite sides thereof. The belt tightener 344 is rockable in opposite directions to tighten the belts of the belt and pulley drives 336, 338 alternately for drive of the right worm shaft in opposite directions, respectively. The belt tightener 346 is similarly rockable to similarly tighten the belts of the belt and pulley drives 340, 342 for drive of the left worm shaft 316 in opposite directions, respectively.

For rocking the belt tighteners 344, 346 a pair of upright crank rods 350, 352 are rotatably mounted on opposite sides of the steering column 71 in bearings, as at 354, and operatively connected by pivoted rods 356, 358 to the lower ends of a pair of upright levers 360, 362 pivoted intermediate the ends thereof, as at 364, 366, on the front of the panel 19 and having their upper ends connected by a pair of pivoted rods 368, 370 to said belt tighteners 344, 346 respectively.

Figure 2:
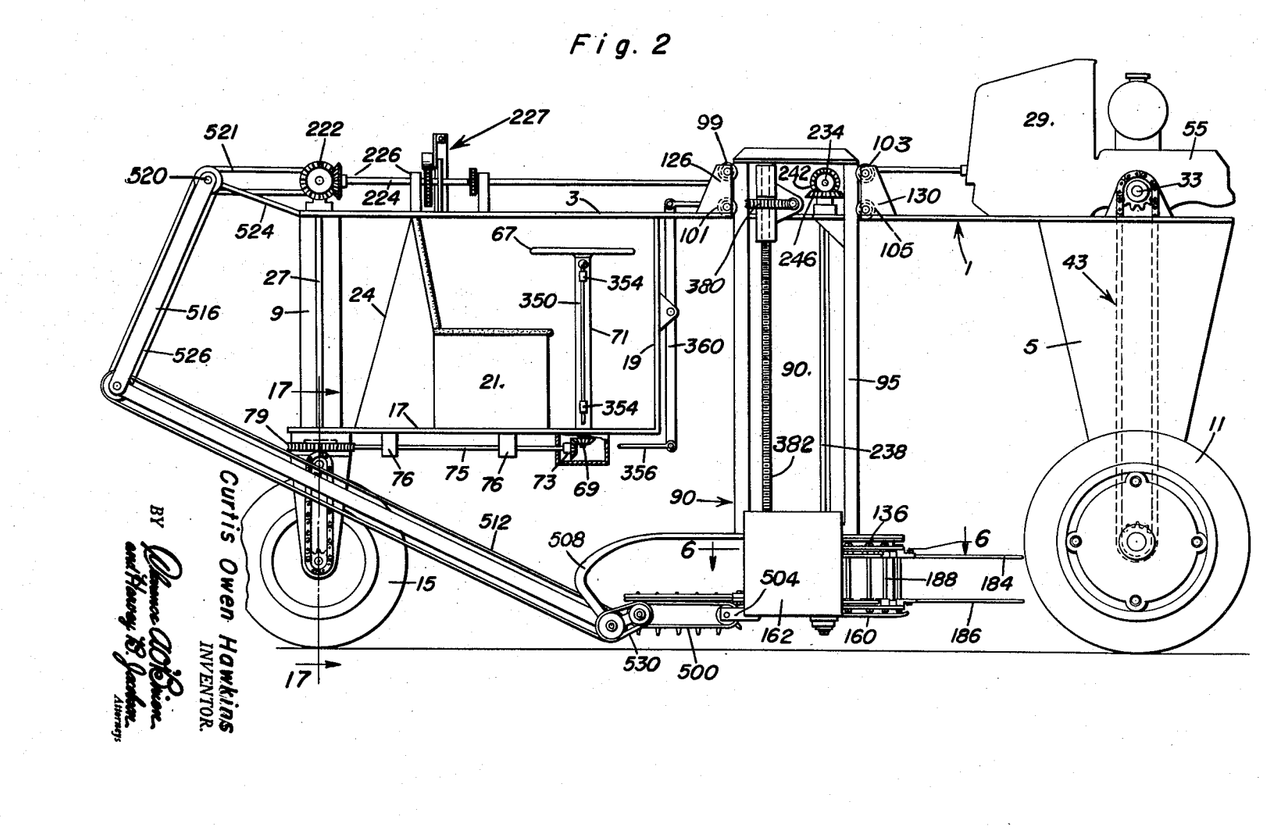
Figure 2 is a view in side elevation with parts broken away and shown in section looking at the right hand side of the machine.

The right and left worm shafts 314, 316 are operatively connected in like manner to the carriage frames, or carriages, 95, 97 as shown for instance in Figures 2, 4 and 5 in connection with the carriage frame 95 for the right stripping unit 90. In this unit a worm 374 on the outer end of the right worm shaft 314 meshes with a driving worm wheel 380 on a threaded vertical shaft 382. The corresponding threaded shaft for the driving worm (not shown) for the carriage frame 97 being shown in Figure 1 at 384. The shaft is mounted vertically in upper and lower sockets 386, 388 on the frame 95 and pinned as at 390 to the socket 388 against rotation for screw feed by the worm wheel 380 which is held against vertical movement in a recess 392 in a vertical sleeve 396 carried by an ear 394 pivoted on the right worm shaft 234.

As will now be seen the described drive for raising and lowering the carriage frames 94, 97 and hence the series of tines 180, 182 of the right stripping unit 90 on the one hand and the series of tines 184, 186 of the left stripping unit 93 on the other hand may be operated to raise or lower the series of tines of the right and left units simultaneously or selectively.

Referring now to Figures 4, 5, and 6 especially the cam slot 150 of drum 136 of the right stripping unit 90 is formed adjacent its top with a widened horizontal dwell portion 400 extending approximately 155° from the rear to the front of the drum 136, around the outboard side of said drum 136 and opening at its front end 402 into a relatively narrower portion 404 declining rearwardly and downwardly around the inboard side of said drum 136 substantially 115° and merging into a substantially horizontal 55° dwell portion 406 adjacent the bottom of the drum 136 and which opens into a riser portion 408 extending substantially 35° on said drum and inclining upwardly and rearwardly to the rear end of the dwell portion 400. The portions 404, 406, 408 are all narrower than said dwell portion 400. A bottom slot 410 coextensive with and below the dwell portion 400 is provided in the drum 136.

The tail blocks 198 of the lower series of tines 182 are supported by the driving disk 158 of unit 90 and are adapted to swing into the slot 410 so that, as shown in Figure 6, the tines of said series 182 may be wiping against the cam plate 164 be swung rearwardly inwardly of the drum 136 into ineffective position. However, said tail blocks 198 when being revolved to the front of drum 136 engage the periphery of said drum 136 and swing the tines 182 on said blocks into substantially radial, coplaner effective position while said blocks 198 ride flat against the periphery of said drum 136 to hold said tines 182 from the front of the drum 136 around the inboard and rear of said drum 136 to the cam plate 164 in effective position.

The tail blocks 196 of the upper series of tines 180 of unit 90 are adapted to swing side fins 412 thereon into the dwell portion 400 as shown in Figure 6 so that the tines 180 on said blocks 196 may wipe against said cam plate 164 and be swung into ineffective elevated position at the outboard side of the drum 136 until the tail blocks 196 reach the front end of the dwell 400. At this point the tail blocks 196 engage and ride against the periphery of the drum 136 to swing the upper tines 180 into radial effective position with the rollers 204 on said blocks 196 entering and fitting behind the declining portion 404 of cam slot 150. At this point the tines 180 of the upper series are forced downwardly succcessively by the portion 404 until the rollers 204 of said tail blocks 196 enter the horizontal dwell portion 406 of groove at which point the tines 180 revolve horizontally until the rollers 204 on said tail blocks 196 enter and ride up the riser portion 408 and become ineffective in the portion 400 to permit the tines 180 of the upper series 180 to be swung into ineffective position in the manner described. The upper series of tines 180 are moved downwardly to strip the leaves off the stalks, revolve horizontally by virtue of the dwell portion 406 to clampingly engage stripped leaves between the same end tines 182 of the lower series, and are moved upwardly, successively by virtue of the riser portion 408 to release the stripped leaves at the rear end of the drum 136.

Of course the cam slot 152 of the drum 138 of the left stripping unit is constructed like the described cam slot 150 and the upper and lower series of tines 184, 186 of the left stripping unit 97 are operated by said cam slot 152 in the same manner as described with reference to the right stripping unit 90.

Short horizontal endless belt conveyors 500, 502 extend rearwardly from the guard disks 158, 60 below the lower series of tines 182, 184 to receive the released stripped leaves and convey the same rearwardly. The conveyors 500, 502 are suspended at one end by lugs 504, 506 on the disks 158, 160 and at the other end thereof by rearwardly extending pairs of arms 508, 510 on the frames 94, 97. A pair of upwardly and rearwardly inclined endless belt conveyors 512, 514 incline upwardly and rearwardly from the conveyors 500, 502 at opposite sides of the chassis 1 to convey the tobacco leaves upwardly and rearwardly to suitable receptacles, not shown. The conveyors 512, 514 are pivoted at their lower ends between the pairs of arms 508, 510 and at their upper ends between pairs of suspension links 516, 518 pivotally suspended from a rear cross shaft 520 extending through a rotary sleeve 522 journaled in brackets 524 on the rear end of the platform 3. The upper ends of the conveyors 512, 514 are driven by belt and pulley connections 526, 528 between said upper ends and opposite ends of the sleeve 522. The sleeve 522 is driven by a belt and pulley connection 521 between the same and the beforementioned jack shaft 218. The conveyors 500, 502 are driven by belt and pulley connections 530, 532 between the lower ends of the conveyors 512, 514 and the front ends of said conveyors 500, 502.

Figure 18:
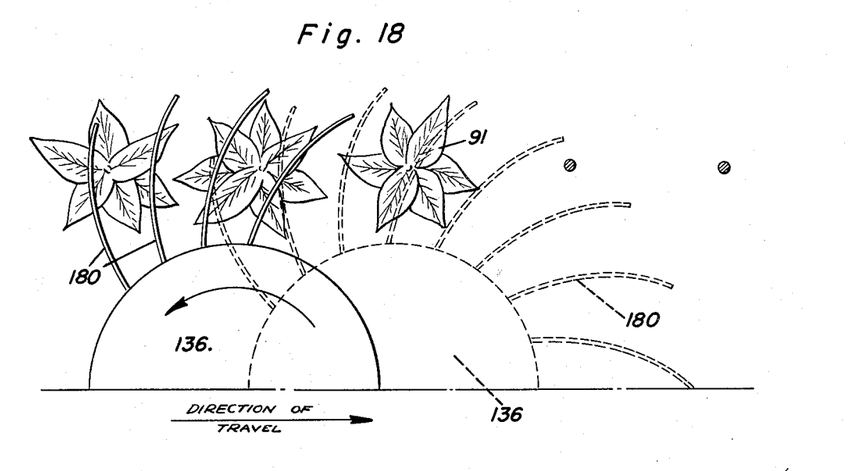
Figure 19:
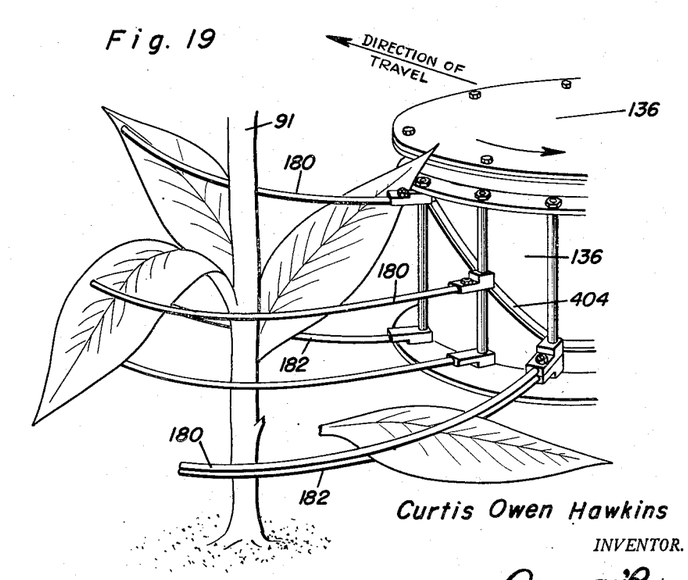

Referring now to the operation of the machine, the same is started at corresponding ends of the two rows of plants 91, 92 with the right and left stripping units 90, 93 straddling the two rows 91, 92. As the machine travels forwardly the series of upper and lower tines 180, 182 and 184, 186 are carried forwardly into the two rows at the inboard side of the drums 136, 138 and because of such movement and revolving rearwardly of said tines at said inboard sides, side by side tines of the two series straddle successive stalks in the rows as shown in Figures 6 and 18 revolve part way around the same while being gradually withdrawn from straddling relation to successive stalks. After starting, the downward movement of the upper series of tines 180, 184 at the inboard sides of the drums 136, 138 while the same are revolving and as shown in Figure 19 by virtue of the cam slots 150, 152 strip leaves off the stalks downwardly, from the height at which the upper series of tines 180, 184 enter the plants, and then by virtue of the lower dwell said upper tines clamp the stripped leaves as shown in Figure 19 between the same and lower tines 182, 186 after which said tines by virtue of the riser portion 408 release said leaves after the same have been revolved over the conveyors 500, 502. By using the accelerating and retarding means 227 revolving of the series of tines may be accelerated or retarded to normally facilitate straddling of the stalks by the series of tines of both right and left stripping units. By operation, through the crank rods 350, 352 the described drive for raising and lowering the carriage frames 95 and hence the series of tines 180, 182 and 184, 186 may be used to start the stripping operation at selected heights on the plant stalks.

The foregoing will it is believed suffice to impart a clear understanding of my invention.

Manifestly, the invention, as disclosed, is susceptible to modification without departing from the inventive concept, and right is herein reserved to such modifications as fall within the scope of the appended claims.

Having described my invention what is claimed as new is:

1. In a tobacco stripping machine for stripping tobacco leaves off the stalks of rows of plants in the field, a chassis including traction wheels and a steerable wheel and of a width to straddle two side by side rows of plants in the field, a motor on said chassis operatively connected to said traction wheels to propel the chassis for travel forwardly along said two rows, a pair of leaf stripping units carried by the chassis on opposite sides thereof and straddling said two rows of plants to travel along the same when said chassis travels forwardly and each including an upper and a lower series of circularly arranged horizontal tines, revolving means embodied in each unit mounting the series of tines of each unit for revolving in unison horizontally, drive means operatively connecting the steerable wheel to said revolving means to revolve the series of tines of each unit in unison during forward travel of the chassis to revolve into the plants of the rows and to revolve about the stalks in straddling relation thereto, means in each unit operatively connected to one of the series of tines of the units and responsive to revolving of the tines of each unit automatically to raise and lower the one unit of tines in each series relative to the other series in the unit into and out of gripping relation to the tines of the other series of the unit to strip leaves off the stalks and grip and release the same while said tines are revolving, and conveyor means on said chassis associated with each unit to convey the released leaves away from said units, and drive means operatively connecting said steerable wheel to said conveyors.

2. The combination according to claim 1, each unit comprising a carriage vertically adjustable on the chassis and operatively connected to said revolving means for raising and lowering the same and the series of tines to cause the series of tines to start stripping at different heights on the stalks.

3. The combination according to claim 2 and drive means operatively connecting said motor to said carriages to raise and lower the same.

4. The combination of claim 2 and drive means operatively connecting said motor to said carriages for raising and lowering the carriages in unison and separately selectively.

5. The combination of claim 2, and drive means operatively connecting said motor to said carriages for raising and lowering the carriages comprising a reversible shaft for each carriage journaled transversely on the chassis, and a reversible transmission connecting said drive shafts and to which said motor is drivingly connected.

6. The combination of claim 1, said tines being longitudinally curved to facilitate straddling the stalks.

7. The combination of claim 1, said tines being pivoted and swingable horizontally on said revolving means into and out of operative position, and coacting means on said units and tines responsive to revolving of the tines to swing the same into and out of operative position.

8. The combination of claim 1, said revolving means comprising a rotary disk for each unit on which one series of tines of the unit are pivoted for swinging into and out of operative position, the other series of tines of the unit being pivotally and slidably mounted on the disk for swinging into and out of operative position and raising and lowering relative to the other series.

9. The combination of claim 1, said revolving means comprising a rotary disk embodied in each unit and mounting the tines thereon, said first named drive means being operatively connected to both disks.

10. The combination of claim 9, and a speed boosting and retarding device for said disks interposed in said first named drive.

11. The combination of claim 1, the third named means comprising a cam member in each unit around which the series of tines in the unit revolve.

12. The combination according to claim 11, said member comprising a drum in each unit around which the series of tines of the unit revolve, each drum of the units having a circumferential cam slot therein engaged by the tines of said one series of the unit for raising and lowering of the slot engaged tines by the slot.

13. In a tobacco stripping machine for stripping tobacco leaves off the stalks of rows of plants in the field, a chassis including traction wheels and a steerable wheel and of a width to straddle two side by side rows of plants in a field, a motor on said chassis operatively connected to said traction wheels to propel the chassis for travel forwardly along said two rows, a pair of leaf stripping units carried by said chassis on opposite sides thereof straddling said two rows of plants to travel along the same when said chassis travels forwardly and each including an upper and a lower series of circularly arranged horizontal tines, revolving means embodied in each unit mounting the series of tines of each unit for revolving in unison horizontally, drive means operatively connecting the steerable wheel to said revolving means to revolve the series of tines of each unit in unison during forward travel of the chassis to revolve into the plants of the rows and to revolve about the stalks in straddling relation thereto, and means in each unit operatively connected to the upper series of tines of the units and responsive to revolving of the tines of each series automatically to raise and lower the upper series of tines in each unit relative to the lower series in the unit into and out of gripping relation to the lower series of tines of the unit to strip the leaves downwardly off the stalks and grip and release the stripped leaves while said tines are revolving.

14. In a tobacco stripping machine for stripping leaves off the stalks of rows of plants in the field, a chassis comprising traction wheels and a steerable wheel, and of a width to straddle two side by side rows of plants in the field, a motor on said chassis operatively connected to said traction wheel to propel the chassis to travel forwardly along said two rows, a pair of leaf stripping units carried by said chassis on opposite sides thereof and straddling the two rows of plants to travel along the same when said chassis travels forwardly and each including a series of circularly arranged horizontal tines, revolving means embodied in each unit and mounting said series of each unit for revolving in unison horizontally and for vertical movement, drive means operatively connecting said steerable wheel to said revolving means to revolve the series of tines in each unit in unison during forward travel of the chassis to revolve into the plants of said rows and to revolve about the stalks in straddling relation thereto, and means in each unit operatively connected to the series of tines of the units and responsive to revolving of the tines of each series to raise and lower the same to strip the leaves off the stalks.

15. The combination of claim 14, said revolving means comprising a rotary disk in each unit to which said steerable wheel is drivingly connected.

16. The combination of claim 15, said series of tines being pivoted on said disks for horizontal swinging into and out of operative position, and means on each unit responsive to revolving of the series of tines for swinging said series of tines into and out of operative position.

No references cited.